United States Patent
Vodyanoy et al.

(10) Patent No.: US 7,542,203 B2
(45) Date of Patent: Jun. 2, 2009

(54) MICROSCOPE ILLUMINATION DEVICE AND ADAPTER

(75) Inventors: Vitaly J. Vodyanoy, Auburn, AL (US); Oleg M. Pustovyy, Auburn, AL (US); Arnold Vainrub, Auburn, AL (US)

(73) Assignee: Auburn University, Auburn, AL (US)

( * ) Notice: Subject to any disclaimer, the term of this patent is extended or adjusted under 35 U.S.C. 154(b) by 0 days.

(21) Appl. No.: 11/487,551

(22) Filed: Jul. 14, 2006

(65) Prior Publication Data

US 2007/0014002 A1    Jan. 18, 2007

Related U.S. Application Data (60) Provisional application No. 60/699,571, filed on Jul. 15, 2005, provisional application No. 60/796,744, filed on May 2, 2006.

(51) Int. Cl.
    *G02B 21/06* (2006.01)
(52) U.S. Cl. .................................................. 359/387
(58) Field of Classification Search ................. 359/387, 359/385
See application file for complete search history.

(56) References Cited

U.S. PATENT DOCUMENTS

| 2,674,157 | A * | 4/1954 | Heine ........................ 359/370 |
| 2002/0135871 | A1 * | 9/2002 | Vodyanoy et al. ........... 359/389 |
| 2005/0237605 | A1 | 10/2005 | Vodyanoy | |

FOREIGN PATENT DOCUMENTS

| DE | 89 05 951 U1 | 6/1989 |
| EP | 1 324 096 A2 | 7/2003 |
| WO | WO 00/16151 | 3/2000 |
| WO | WO 2000/37977 | 6/2000 |
| WO | WO 01/35143 | 5/2001 |
| WO | WO 01/57565 | 8/2001 |
| WO | WO 01/61324 A | 8/2001 |
| WO | WO 02/061485 A2 | 8/2002 |
| WO | WO 2004/131816 | 4/2004 |
| WO | WO 2007/046021 | 4/2007 |
| WO | WO 2007/046188 | 4/2007 |
| WO | WO 2007/050470 | 5/2007 |
| WO | WO 2007/076578 | 7/2007 |
| WO | WO 2007/077373 | 7/2007 |
| WO | WO 2007/085721 | 8/2007 |

(Continued)

OTHER PUBLICATIONS

L.C. Martin, An Introduction to Applied Optics. V. 2 (Pitman & Sons, London 1932).

(Continued)

*Primary Examiner*—Joshua L Pritchett
(74) *Attorney, Agent, or Firm*—Andrus, Sceales, Starke & Sawall LLP (57) ABSTRACT

The present invention is a dark field illumination system including a light source which is fixed on an entrance slit of a condenser and an objective aligned with the condenser such that the objective and the condenser are adjusted to find a focus spot on a sample. The present invention essentially uses structured illumination to achieve an improved illumination system. The present invention also includes a system and method wherein the objective is coupled to an iris and aligned with the condenser such that when the iris is closed only dark field images are produced, and when the iris is open, direct entrance of light is allowed into the objective and bright field illumination is produced.

14 Claims, 7 Drawing Sheets

FOREIGN PATENT DOCUMENTS

| WO | WO 2007/088529 | 8/2007 |
| WO | WO 2007/094845 | 8/2007 |
| WO | WO 2007/094987 | 8/2007 |
| WO | WO 2007/095029 | 8/2007 |
| WO | WO 2007/095037 | 8/2007 |
| WO | WO 2007/103436 | 9/2007 |
| WO | WO 2007/111973 | 10/2007 |
| WO | WO 2007/118418 | 10/2007 |
| WO | WO 2007/142846 | 12/2007 |
| WO | WO 2008/069253 | 6/2008 |

OTHER PUBLICATIONS

S.W. Hell, "Toward Flourescence Nanoscopy," Nature Biotechnol. 21, 1347 (2003).

Y. Garini, B.J. Vermolen & I.T. Yong, "From Micro to Nano: Recent Advances in High-Resolution Microscopy," Curr. Opin. Biotechnol. 16, 3 (2005).

V. Westphal & S.W. Hell, "Nanoscale Resolution in the Focal Plane of an Optical Microscope," Phys. Rev. Lett. 94, 143903 (2005).

M.G.L. Gustafsson, "Nonlinear Structured-Illumination Microscopy: Widefield Fluorescence Imaging with Theoretically Unlimited Resolution," PNAS 102, 13081 (2005).

M. Schrader, M. Kozubek, S.W. Hell, & T. Wilson, "Optical Transfer Functions of 4Pi Confocal Microscopes: Theory and Experiment," Opt. Lett. 22, 436 (1997).

T.M. Richardson, "Test Slides: Diatoms to Divsions—What Are You Looking At? Part 1," Proc. Roy. Microsc. Soc. 33, 3(1998).

M. Born & E. Wolf. Principles of Optics (Cambridge University Press, 7th ed. 1999).

L.C. Martin. The Theory of the Microscope (Elsevier, New York, 1966).

H.H. Hopkins, "Some Problems in the Diffraction Theory of Optical Instruments," Sci. J. Roy. College 20, 100 (1949).

Thaxton, CS & Mirkin, CA, "Plasmon Coupling Measures Up," Nature Biotechnology, vol. 23, No. 6, Jun. 2005, 681-2.

Rothenhausler, B. & Knoll, W., "Surface—Plasmon Microscopy," Nature, vol. 332, Apr. 14, 1988, 615-7.

So, P., "Resolution Enhancement in Standing-Wave Total Internal Reflection Microscopy: A Point-Spread-Function Engineering Approach," J. Opt. Soc. Am.A., vol. 18, No. 11, Nov. 2001.

Ben-Aryeh, Y. et al., "Increase of Optical Resolution by Evanescent Waves," Physics Letters A, 328(2004), 306-312.

Frohn, J.T. et al., "True Optical Resolution Beyond the Rayleigh Limit Achieved by Standing Wave Illumination," PNAS, vol. 97, No. 13, Jun. 20, 2000, 7232-6.

Rajgarhia, Santosh Kumar, Rotate Head On/Off LED Torch With Magnifier Lens, 1128/DEL/2007, Feb. 13, 2009 (Abstract).

Lewis, David E., An Apparatus for Moving an Optical Head from an Initial Track to a Target Track on a Storage Medium, 524/DEL/1999, Jan. 23, 2009, (Abstract).

\* cited by examiner

MICROSCOPE ILLUMINATION DEVICE AND ADAPTER

CROSS REFERENCE TO RELATED APPLICATION(S)

This application claims priority under 35 U.S.C. §119(e) of the U.S. Provisional Application No. 60/699,571, filed on Jul. 15, 2005 and entitled "MICROSCOPE ILLUMINATION DEVICE AND ADAPTER." The Provisional Application No. 60/699,571, filed on Jul. 15, 2005, and entitled "MICROSCOPE ILLUMINATION DEVICE AND ADAPTER" is also hereby incorporated by reference.

This application also claims priority under 35 U.S.C. §119(e) of pending U.S. Provisional Application No. 60/796,744, filed on May 2, 2006, and entitled "90 NM RESOLUTION AND OPTICAL TRANSMISSION MICROSCOPE WITH ANNULAR CONDENSER." The U.S. Provisional Application No. 60/796,744, filed on May 2, 2006, and entitled "90 NM RESOLUTION AND OPTICAL TRANSMISSION MICROSCOPE WITH ANNULAR CONDENSER" is also hereby incorporated by reference.

FIELD OF THE INVENTION

The invention relates to the field of microscopy. More particularly, the invention relates to the field of high resolution optical microscopy.

BACKGROUND OF THE INVENTION

Figure 1A:
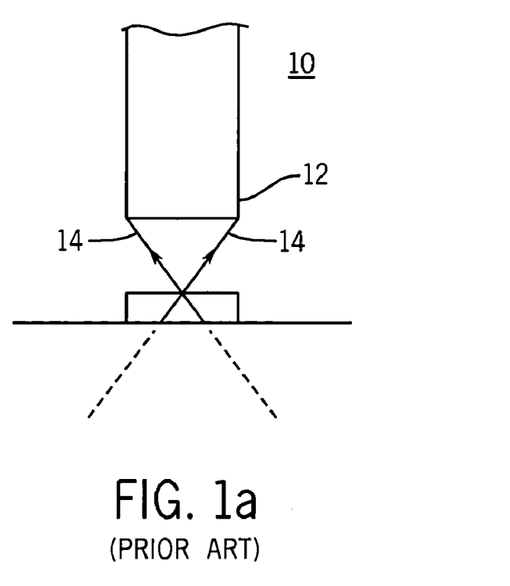
FIG. 1a illuminates a block diagram of a bright field illumination system of the prior art.
Figure 1B:
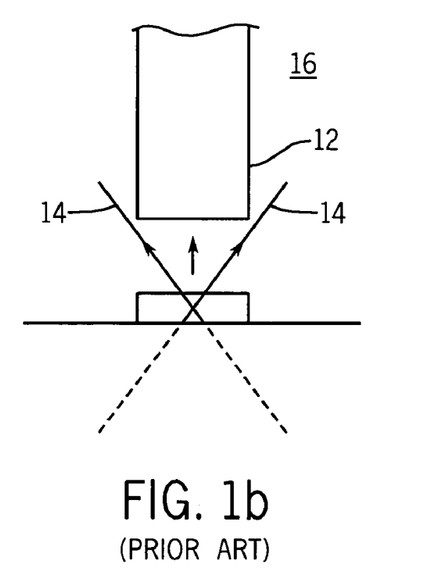
FIG. 1b illustrates a block diagram of a dark field illumination system of the prior art.

FIGS. 1a and 1b illustrate two types of light illuminations. FIG. 1a illustrates Bright Field illumination 10. Bright Field illumination is present when the aperture of the objective 12 (of the microscope) is smaller or equal to the aperture of the condenser (not shown). A main feature of Bright Field illumination 10 is that all light 14 should go into the objective.

FIG. 1b illustrates Dark Field illumination 16. Dark Field illumination 16 is present when the aperture of the objective 12 is smaller than aperture of the condenser. Direct light coming out of the condenser does not go into the objective 12 in Dark field illumination 16. However, misalignment of the condenser, for example, can introduce background light or noise into the system, which reduces contrast. Therefore, circular symmetry of the illumination system is required for Dark Field illumination 16.

Dark Field illumination 16 has some distinct advantages over Bright Field illumination 10. Dark Field illumination 16 has much higher contrast and better light economy than Bright Field illumination 10.

Figure 1C:
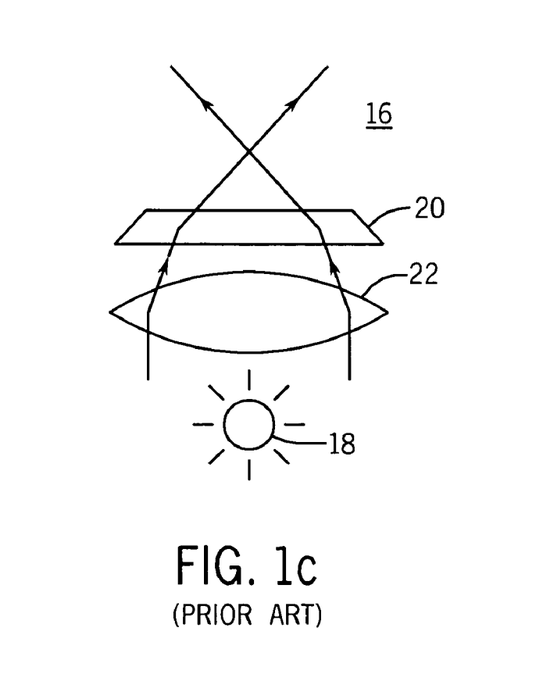
FIG. 1c illustrates a block diagram of a dark field illumination system of prior art.

FIG. 1c illustrates the alignment issues involved with the Dark Field Microscope in FIG. 1b. The light source 18, condenser 20, and axicon lens 22 must be perfectly aligned such that the angle of the light path 14 intersects and illuminates the sample properly as will be explained in further detail herein. It should be noted that FIGS. 1b and 1c have been simplified from FIG. 1a in that both FIGS. 1a and 1b do not show the condenser, axicon lens, nor the light source 18, but the Bright Field and Dark Field Microscopes depicted in FIGS. 1a and 1b, respectively, can include such elements.

Figure 2A:
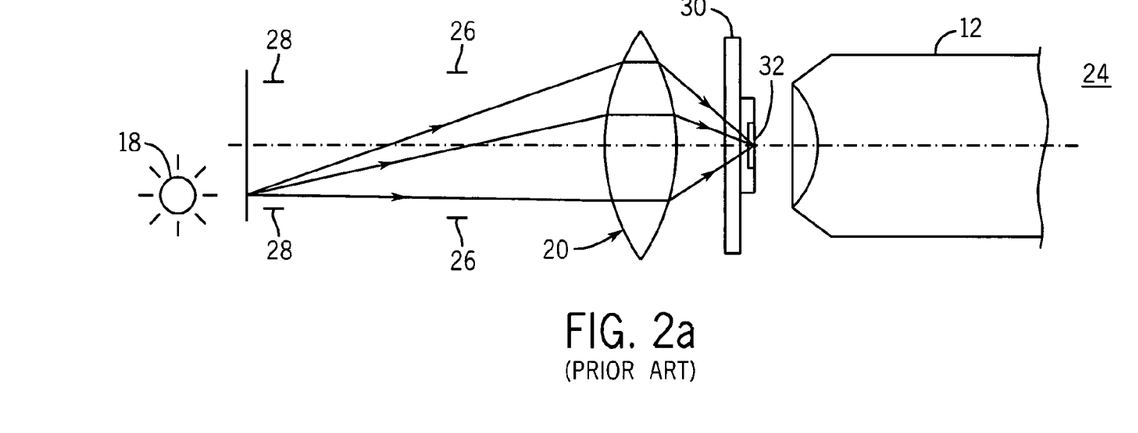
FIG. 2a illustrates a graphical representation of a critical illumination system of the prior art.

Various methods of illumination are employed in Dark Field Illumination 16. Two commonly used methods are Critical illumination and Kohler illumination. FIG. 2a illustrates the Critical illumination 24. The system includes a uniformly bright light source 18, a diaphragm 28, a condenser aperture 26, a condenser 20, a slide 30, a sample 32 coupled to the slide 30, and a microscope objective 12. In this method of illumination, the uniformly bright light source 18 is placed close behind the diaphragm and is imaged by the condenser 20 on to an object plane of the microscope objective 12. The size of the field stop aperture is adjusted so that its image by the condenser 20 just covers the field. The complex degree of coherence for any pair of points in the object lance of the objective 12 is the same as that due to an incoherent source of filling the condenser aperture 26; moreover it is independent of the aberrations of the condenser 20. The light source 18 is focused on the sample 32. Resolving power depends only on the degree of coherence of the light incident upon the object and on the properties of the microscope objective 12. Aberrations of the condenser 20 have no influence on the resolving of a microscope.

Figure 2B:
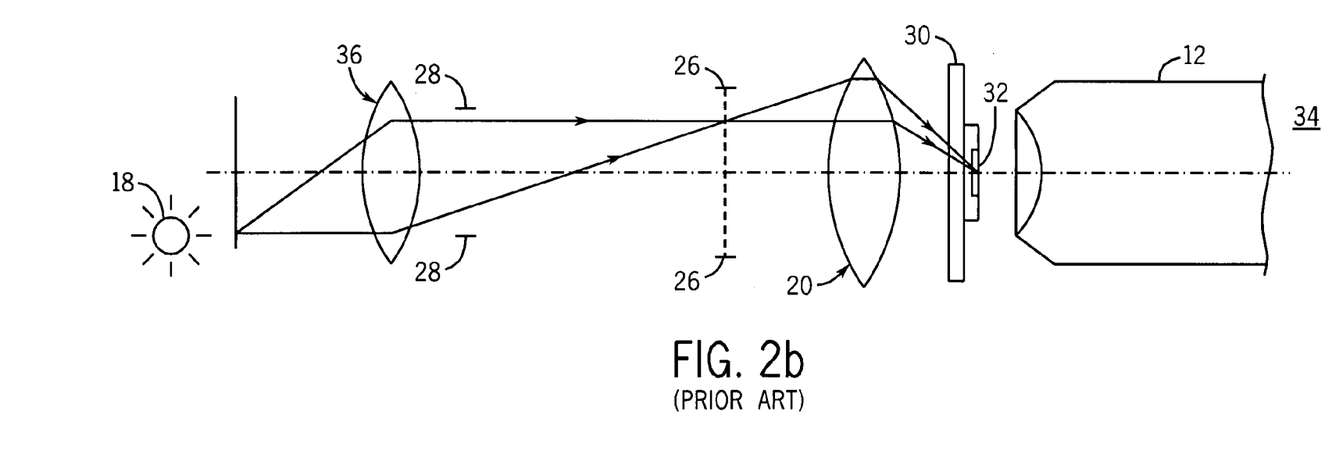
FIG. 2b illustrates a graphical representation of a Kohler illumination system of the prior art.

FIG. 2b illustrates the Koehler illumination 34 method within a prior art microscope system suitable for Koehler illumination 34. The system includes a light source 18, an auxiliary lens 36, a diaphragm 28, a condenser aperture 26, a condenser 20, a slide 30, a sample 32 coupled to the slide 30, and a microscope objective 12. In this method, the auxiliary lens 36 is placed close to the diaphragm 28 and forms an image of the source light in the focal plane of the condenser 20 which now includes a condenser diaphragm 28. Rays from each light source 18 point then emerge from the condenser 20 as a parallel beam. The light source 18 is focused on an aperture of the condenser 20. Irregularities in the brightness distribution on the source light do not cause irregularities in the intensity of the field illumination.

Furthermore, recent progress in high-resolution optical microscopy has been boosted by demands of cellular biology and nanoscience. In fluorescence microscopy the image resolution of few tens of nanometers has been demonstrated. However, in transmission and reflection microscopy, with visible light illumination even for modern confocal instruments, the reported lateral image resolution does not surpass 180 nm.

SUMMARY OF THE INVENTION

The present invention is a dark field illumination system including a light source which is fixed on an entrance slit of a condenser and an objective aligned with the condenser such that the objective and the condenser are adjusted to find a focus spot on a sample. The present invention essentially uses structured illumination to achieve an improved illumination system. The present invention also includes a system and method wherein the objective is coupled to an iris and aligned with the condenser such that when the iris is closed only dark field images are produced, and when the iris is open, direct entrance of light is allowed into the objective and bright field illumination is produced.

In one aspect of the present invention, an illumination system for illuminating a sample includes a light source focused on an entrance slit of a condenser and an objective aligned with the condenser, wherein the objective and the condenser are adjusted to find a focus spot on the sample. The system further includes means for focusing the light source on the entrance slit of the condenser, wherein the focusing means includes a collimating lens and a light guide and/or a flat surface mirror.

In another aspect of the present invention, a method of illuminating a sample comprises the steps of focusing a light source on an entrance slit of a condenser, aligning an objective with the condenser and adjusting the objective and the condenser to find a focus spot on the sample. The light source is focused on the entrance slit of the condenser with a focusing means wherein the focusing means includes a collimating lens and light guide and/or a flat surface mirror.

In another aspect of the present invention, a high resolution system for producing mixed illumination includes a light source focused onto an annular entrance slit of a condenser and an objective aligned with the condenser, wherein an iris coupled to the objective is opened so as to allow the direct entrance of light into the objective. A front lens of the objective is illuminated by an annular light produced by an empty cone of light entering the objective, and the objective is a high aperture microscope objective. The system further includes an adapter for illuminating the entrance slit of the condenser, an axicon lens for illuminating the entrance slit of the condenser. The condenser is pre-aligned with an entrance port of the light source and a collimating lens, and a light guide coupled between the light source and the collimating lens and/or a flat surface mirror for reflecting light from the light source to the entrance slit of the condenser. Furthermore, the illumination system generates diffraction fringes, and provides narrowed point spread function (PSF).

In another aspect of the present invention, a method of producing mixed illumination in a high resolution system includes the steps of focusing a light source onto an annular entrance of a condenser, aligning an objective with the condenser and opening an iris coupled to the objective so as to allow the direct entrance of light into the objective. The method further includes the step of illuminating a front lens of the objective by an annular light produced by an empty cone of light entering the objective, wherein the objective is a high aperture microscope objective.

The method further includes the step of illuminating the entrance slit of the condenser with an adapter or with an axicon lens. The method further includes the step of pre-aligning the condenser with an entrance port of the light source and a collimating lens, coupling a light guide between the light source and the collimating lens, and providing a flat surface mirror to reflect light from the light source to the entrance slit of the condenser. Furthermore, the illumination system generates diffraction fringes, and provides a narrowed point spread function (PSF).

In another aspect of the present invention, a high resolution system for producing dark-field illumination includes a light source focused onto an annular entrance slit of a condenser and an objective, the objective coupled to an iris and aligned with the condenser, wherein the iris is closed such that only dark-field images are produced. A front lens of the objective is illuminated by an annular light produced by an empty cone of light entering the objective, and the objective is a high aperture microscope objective. The system further includes an adapter for illuminating the entrance slit of the condenser and/or an axicon lens for illuminating the entrance slit of the condenser. The condenser is pre-aligned with an entrance port of the light source and collimating lens.

In yet another aspect of the present invention, a high resolution system for producing mixed illumination includes a light source focused onto an annular entrance slit of a condenser and an objective, the objective coupled to an iris and aligned with the condenser, wherein when the iris is opened so as to allow the direct entrance of light into the objective, substantially bright-field illumination is produced, and when the iris is closed, only dark-field illumination is produced. A front lens of the objective is illuminated by an annular light produced by an empty cone of light entering the objective, and the objective is high aperture microscope objective. The system further includes an adapter for illuminating the entrance slit of the condenser, and/or an axicon lens for illuminating the entrance slit of the condenser, and further wherein the condenser is pre-aligned with an entrance port of the light source and collimating lens.

DETAILED DESCRIPTION OF THE INVENTION

The present invention comprises an illumination system which includes a light source, a light guide, a collimation system, which can be coupled to an adapter or axicon lens, mirror and condenser. The illumination system can have near perfect optical alignment. The system provides for perfect circular symmetry with great light economy. The optional adapter and optional axicon lens save light and send all available light into the slit of the condenser. The condenser can prevent spherical aberrations. The optical adapter and/or optional axicon lens provide for the annular entrance of light through the entrance slit of the condenser.

The illumination system of the present invention features the main principles of Kohler illumination and a main property of Critical illumination. Kohler illumination preset and fixed by optical design in the system, thus focusing a source light on an entrance slit of the condenser. The illumination system can then be adjusted (up or down) to focus the source light coming out of the condenser on the sample, featuring one of the main properties of Critical illumination. Thus, Kohler illumination is initially fixed, and then the illumination system of the present invention can be adjusted up or down to find the proper position and size of an illuminated spot, which is a main feature of Critical illumination.

The described features of the above illumination system provide increased contrast and resolution not achieved by current standard dark field, epi-fluorescence, and TIRF microscopy. TIRF (Total Internal Reflection Fluorescence)

microscopes provide only single sided illumination. The illumination system of the present invention provides circular illumination with 360° symmetry.

The system provides a unique view of live cells and cell processes while they are occurring. A small illumination volume creates a capability of three-dimensional sectioning without scanning. The selective excitation of fluorescence eliminates the out-of-focus light and reduces photobleaching present in conventional epi-fluorescence. The illumination system of the present invention has at least four times better light economy and higher transmission efficiency compared to a conventional epi-fluorescence system. Thus, smaller spot sizes produce increased contract and decrease bleaching of the sample.

The illumination system of the present invention is preferably self-contained and portable. It can be easily mounted onto standard transmitting light microscopes. The device provides for simple positioning, centering and focusing and does not require skilled operators to align and operate.

The illumination system of the present invention can be used in the field of medicine, biomedical industry, pharmaceutical industry, hematology, forensic sciences, food industry, military and other applications.

Figure 5:
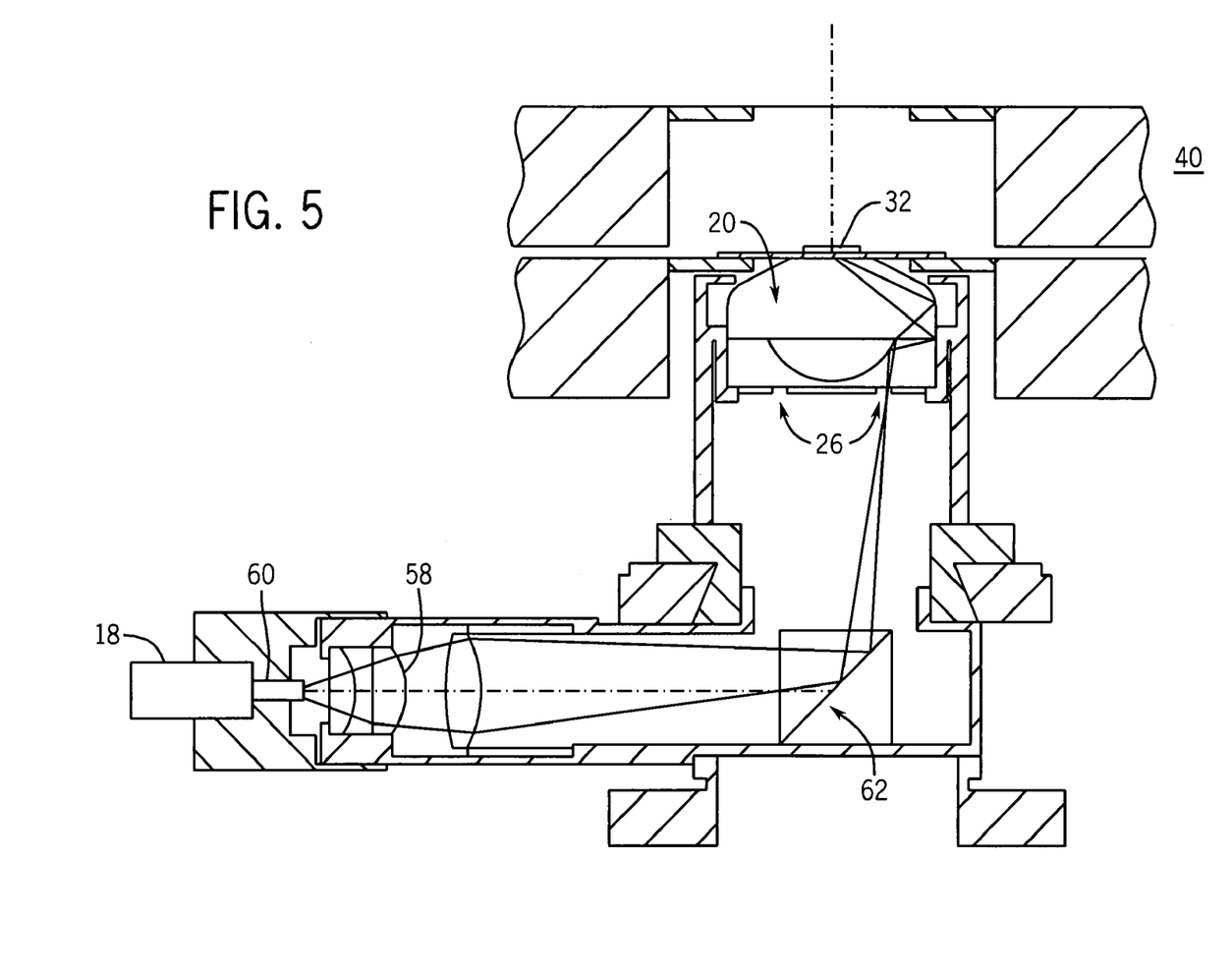
FIG. 5 illustrates a block diagram of a system according to an embodiment of the present invention.

FIG. 5 illustrates one embodiment of the illumination system 40, of the present invention. In the FIG. 5, light coming from a light source 18 is passed to at least one collimating lens 58 via a light guide 60. The light is then reflected by an optional flat mirror 62 and is focused at an entrance slit or aperture 26 of the dark field condenser 20. The condenser 20 directs and focuses the light on the sample 32. As shown in the FIG. 5, the light is directed to the condenser 20 via at least one of the entrance slits or apertures 26. By adjusting one of the lenses of the system 40, the incoming light can be moved toward either an inner edge of the slit 26 or an outer edge of the slit 26. Moving the light towards the inner edge of the slit (6) results in a lower resolution but greater intensity of light. Moving the light toward the outer edge of the slit 26 results in a higher resolution but lesser intensity of light.

Figure 4:
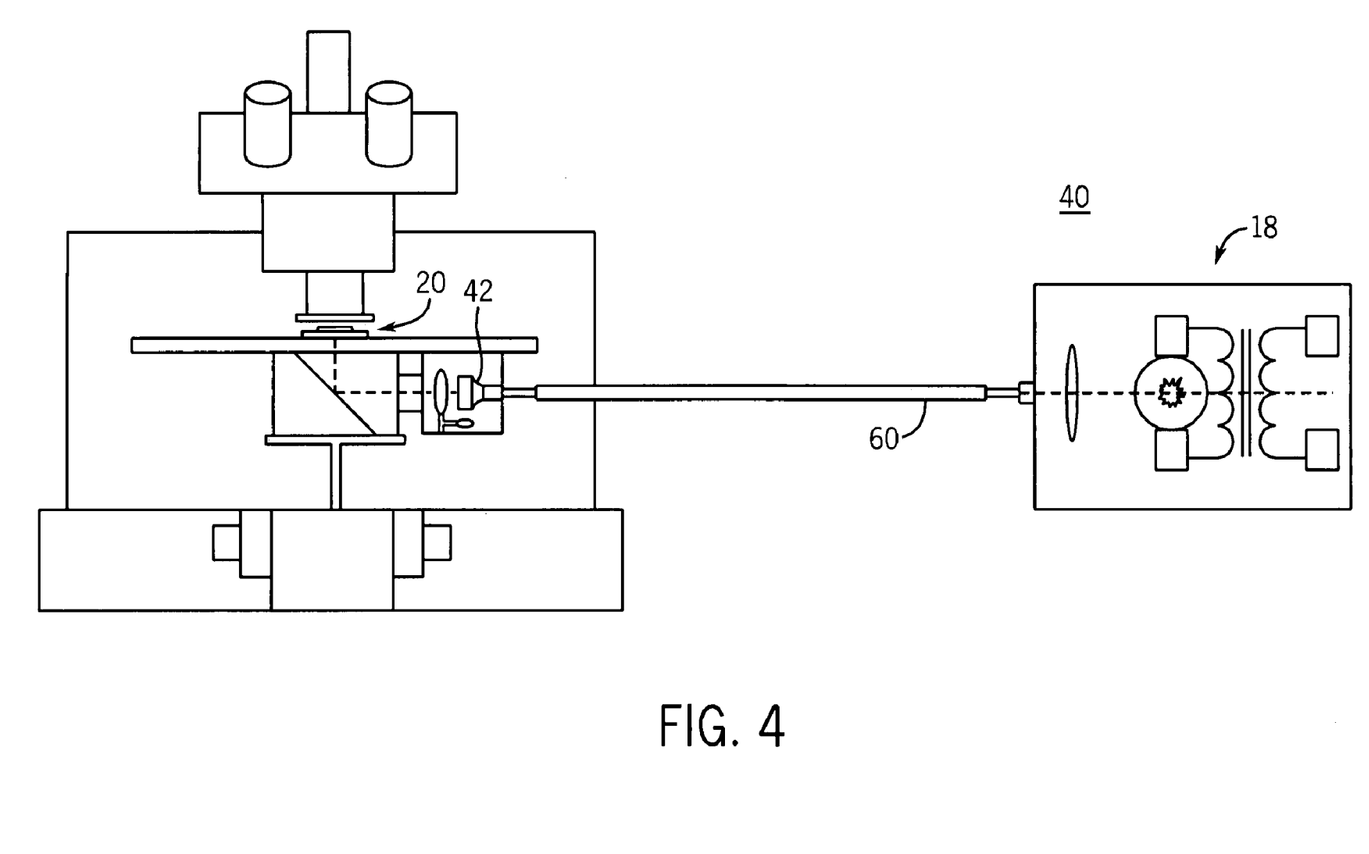
FIG. 4 illustrates a block diagram of a system according to an embodiment of the present invention.

FIG. 4 illustrates an alternative embodiment of the illumination system 40 of the present invention. In the FIG. 4, an adapter 42 is coupled between the light guide 60 and the condenser 20. The adapter 42 provides better light economy and can be used in combination with the condenser 20 such that the adapter is sized and shaped to fit within cavity of the dark field condenser, which thereby provides a fitting between the light source 18 and the condenser 20. As mentioned above, the adapter 42 can be replaced with an axicon lens (not shown).

Figure 3:
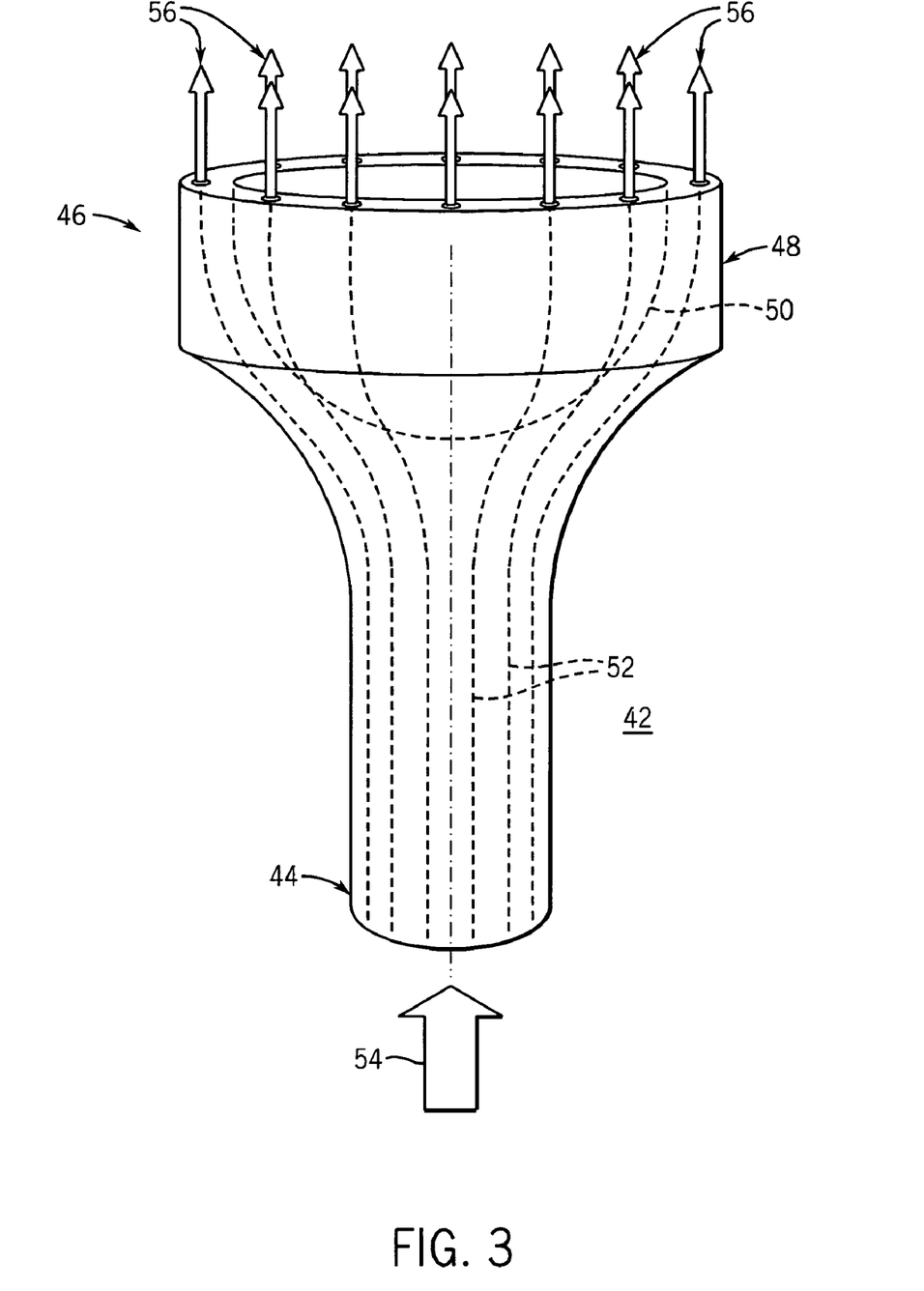
FIG. 3 illustrates a graphical representation of a dark field adapter according to an embodiment of the present invention.

FIG. 3 illustrates the adapter as used in the illumination system 40. The adapter includes an external spacer 48, an internal spacer 50, optical fibers 52, a parallel light beam 54 near a first end portion 44, and a cylindrical light beam 56 near a second end portion 46. A central axis extends through the adapter 42 in a direction generally parallel to the orientation of the condenser and the microscope in use.

In addition to improving the clarity of sample being viewed by the dark field microscope due to increased quality of the illumination, this adapter 42 can reduce power of the light source requirement by 80-87%. Furthermore, the adapter 42 is easily utilized in existing dark field microscopes.

The illumination system of the present invention achieves resolution lower than 120 nm and detection below 50 nm.

The resolution of conventional and optical microscopy is limited by the wave nature of light and is conventionally defined by the Rayleigh criterion; this is commonly referred to as diffraction limited resolution (limit of ~240 nm). In the illumination system 40 of the present invention, non-diffraction limited optical effects and improved point spread function are produced that extend its resolution well beyond diffraction limits.

Some of these optical effects include standing evanescent waves, plasmon resonance, and fluorescence. The geometry and high numerical aperture of the system 40 produces ideal conditions for the generation of standing evanescent waves, similar to TIRF. Also, depending on the conductivity of the sample, localized surface plasmon resonance (LSPR) will be generated, which allows the observation of samples such as carbon nanotubes and other nano-materials and provides superior contrast without loss of spatial resolution. Since photons also behave as particles, they can be deflected and scattered by very small objects. Therefore, very small objects (e.g., viral particles) are readily observed using the system, 40 due to is high contrast.

Recent progress in high-resolution optical microscopy has been boosted by demands of cellular biology and nanoscience. In fluorescence microscopy the image resolution of few tens of nanometers was demonstrated. However, in transmission and reflection microscopy with visible light illumination even for modern confocal instruments the reported lateral image resolution does not surpass 180 nm.

90 nm Resolution

Figure 6A:
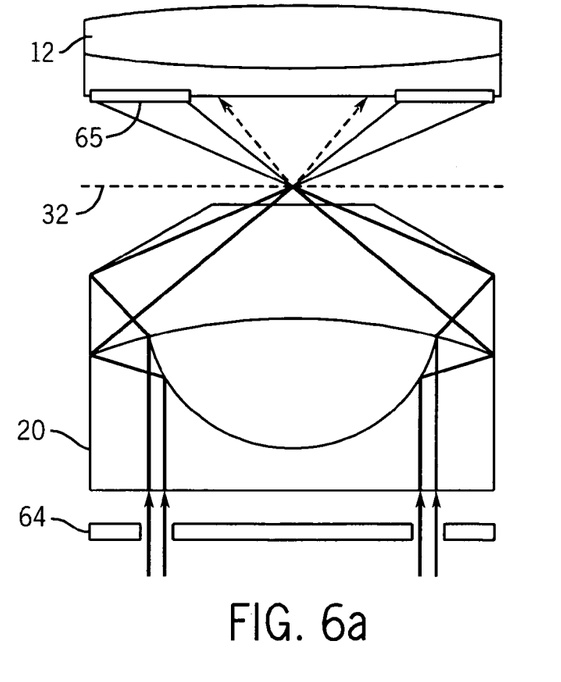
FIG. 6a and 6b illustrate a graphical representation of an illumination system with annular and an objective with an iris condenser according to an embodiment of the present invention.
Figure 6B:
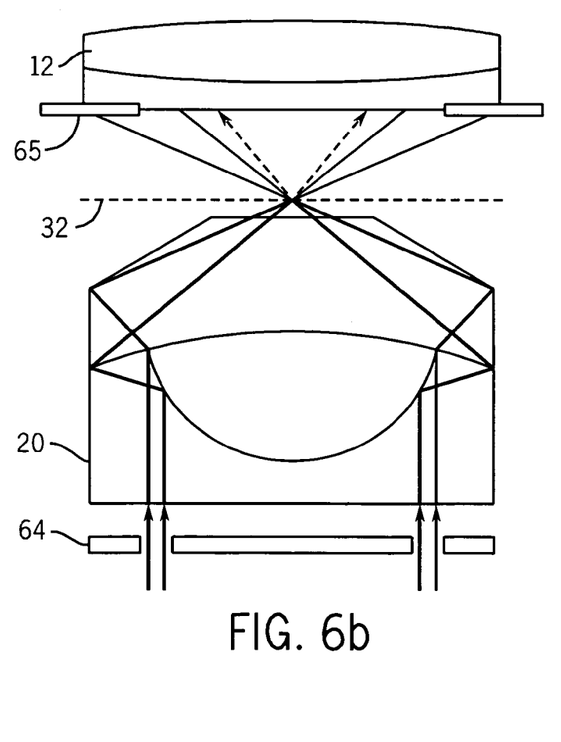

The system 40 of the present invention reports 90 nm resolution in the images obtained using a high aperture Cardioid annular condenser 20 (hereafter, annular A-condenser). Referring to FIGS. 6a and b, the system produces a highly oblique hollow cone of light. Coupled with a high aperture microscope objective 12 with iris 65 the system provides two different regimes of illumination. When the iris 65 is closed so that no direct light enters the objective 12 (FIG. 6a) after passing through the sample 32, only refracted, scattered, or diffracted light goes in the objective 12 (FIG. 6a). If the iris 65 is open in such a way as to allow the direct entrance of light into the objective 12, the front lens of the objective 12 is illuminated by the annular light produced by the empty cone of light entering the objective 12 (FIG. 6b). In this case, mixed illumination is produced which combines the dark-field and oblique hollow cone bright-field illuminations. The cardioid condenser 20 is an integral part of the illumination system so that the system comprises collimation lenses and a first surface mirror that focus light onto the annular entrance slit of the condenser. As part of the illumination system, the condenser is pre-aligned and therefore additional alignment is unnecessary.

The illumination system is positioned in an Olympus BX51 microscope by replacing a regular bright-field condenser (hereafter, circular C-condenser). The illumination system is connected with a light source by a liquid lightguide. The objective used for this work is infinity corrected objective HCX PL APO 100×/1.40–0.70, oil, iris from Leica. The image is magnified with a zoom intermediate lens, a homebuilt 40× relay lens, and captured by a Peltier-cooled camera and Dimension 8200 Dell computer. The microscope is placed onto a vibration isolation platform. Bright-field images were obtained by replacing the illumination system with an Olympus bright-field condenser and connecting the EXFO120 light source with the rear microscope light port by an Olympus X-Cite 120 adaptor. All images were made by using Richardson Test Slides.

The high magnification geometrical patterns that were chosen for imaging include vertical grating arrays that provide a series of lines of 100 nm width at a 200 nm centre spacing, vertical/horizontal resolution bar sets ranging from 250 nm to 50 nm, and solid circles ranging from 4 microns to 60 nm. Patterns of Richardson slides were tested with a JEOL 7000F Field Emission Scanning Electron Microscope. Scales were calibrated by a NIST traceable master system. As true diameters of circles on the test slides have been established, these circles were used to image and analyze the diffraction patterns.

To understand the enhanced resolving power, the diffraction theory of optical image results for both the cases of C- and A-illumination system (C-circular, A-annular) are presented. For simplicity, the calculations are performed for the axial symmetry case of opaque disk of the radius r=50 nm when the image is given by compact integrals easy to evaluate. In addition, the small object's size compared to used light wave length $\lambda_0$=546 nm assures totally coherent illumination conditions. Experimentally, images of 50 nm radius disk (chromium film circle on the glass Richardson slide) for different microscope objective numerical apertures in the range from N=0.7 to 1.4 were measured. The theory is in excellent accord with experiment and thus clearly reveals the mechanism of improved resolution.

The light amplitude $U_1(x_1, y_1)$ in the image formed by a coherent optical system can be written as the convolution of the input in object's plane $U_0(x_0, y_0)$ and the point spread function (PSF) $P(x, y)$ $$U_1(x_1, y_1) = \int_{-\infty}^{\infty} \int_{-\infty}^{\infty} U_0(x_0, y_0) P(x_1 - x_0, y_1 - y_0) dx_0 dy_0 \quad (1)$$

First, the bright-field regime is considered when the light pencil passing geometrically through the transparent part of the object reaches the entrance pupil. The C-condenser forms the light cone with the numerical aperture N=1.4 that fills up all the pupil. For A-condenser the hollow light cone with N from 1.2 to 1.4 illuminates only the corresponding peripheral ring of the entrance pupil (FIG. 6B). For example, in pupil of the radius $\alpha$ with the aperture N=1.4 the inner and outer radii of the illuminated ring are $\epsilon\alpha$ and $\alpha$, where $\epsilon$=1.2/1.4=0.86 (the entrance aperture less than N=1.2 corresponds to the dark-field regime and is considered below separately). Omitting the derivation, from Eq.(1) the image of the circular hole in opaque screen is $$U_1(\rho_1) = \frac{k_0 N r}{a} \int_{\epsilon a}^{a} J_1\left(\frac{k_0 N r \rho}{a}\right) J_0\left(\frac{k_0 N \rho_1 \rho}{a}\right) d\rho \quad (2)$$

Here $\rho_1$ is the radius in the image plane, $J_0(x)$ and $J_1(x)$ are the Bessel functions, and $k_0=2\pi/\lambda_0$, where $\lambda_0$ is the light wavelength in vacuum. This result was derived for $\epsilon$=0 (C-condenser) by Martin, and is generalized here for A-condenser in bright-field mode (0<$\epsilon\leq$1). As expected, in case of the point-like hole r→0, Eq. (2) reduces to the known PSF function for the annular ($\epsilon\alpha\leq\rho\leq\alpha$) entrance pupil. If the entrance aperture infinitely increases $\alpha\to\infty$, the diffraction fringes disappear, and the image is simply the bright circle. However, in general case no explicit formula for the integral in Eq. (2) is available, but it can be computed using the commercial software. Finally, using Babinet's principle the image of opaque circular disk is $$U_d(\rho_1) = U - U_1(\rho_1) \quad (3)$$

Here U is the amplitude without any object which in this case is constant because of the small angular size of the disk r=50 nm. In experiment, the intensity is measured by $I_d(\rho_1)=|U_d(\rho_1)|^2$.

Next, the dark-field regime (FIG. 6A) is considered. For A-condenser, 20 this occurs when the iris 65 diaphragm reduces the entrance aperture to N<1.2. To describe the light wave scattered by the chromium disk, we follow the directions of Mie's theory for diffraction are followed by a conducting sphere. For the sphere's radius r<$\lambda_0$, the polar diagram of scattering is strongly anisotropic with the maxima directed along the incident light beam as:

$$u_0(\xi) = \cos^m \xi \quad (4)$$

Light concentrates around forward direction $\xi$=0 as m increases.

The resulting light distribution in the entrance aperture is expressed by $$u(\theta) = \frac{1}{2\pi} \int_0^{2\pi} u_0(\xi) d\varphi \quad (5)$$

$$= \frac{1}{2\pi} \int_0^{2\pi} (\sin\theta \sin\theta_0 \cos\varphi + \cos\theta \cos\theta_0)^m d\varphi$$

Using the general formula for PSF, we write for the dark-field regime:

$$P_{dark\text{-}field}(\rho_1) = \int_0^a u(\theta) J_0\left(\frac{k_0 N \rho_1 \rho}{a}\right) \rho d\rho \quad (6)$$

Finally, substitution of Eq.(6) in Eq.(1) gives the image in the dark field $$U_{1dark\text{-}field}(\rho_1) = \int\int_{object} P_{dark\text{-}field}(\rho_1 - \rho_0) dx_0 dy_0 \quad (7)$$

where for briefness the vector $\rho$ denotes the point (x,y).

Figure 7A:
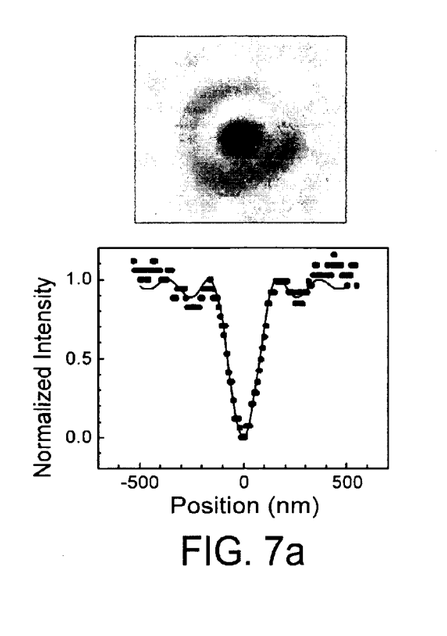
FIG. 7a illustrates image and intensity plots of a cardioid condenser with a 50 nm radius opaque disk having an NA=1.4.
Figure 7B:
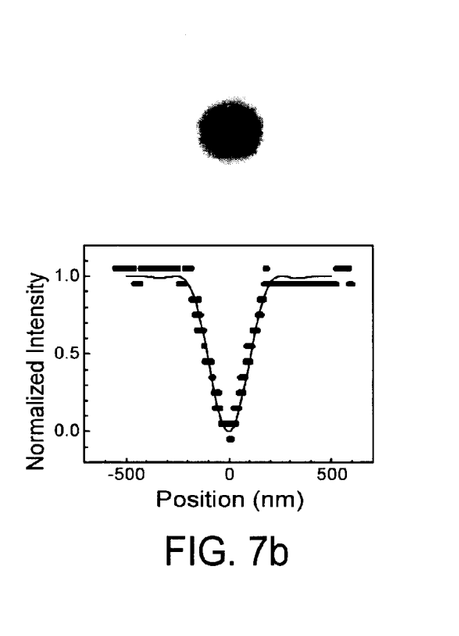
FIG. 7b illustrates image and intensity plots of a bright field condenser with a 50 nm radius opaque disk having an NA=1.4
Figure 7C:
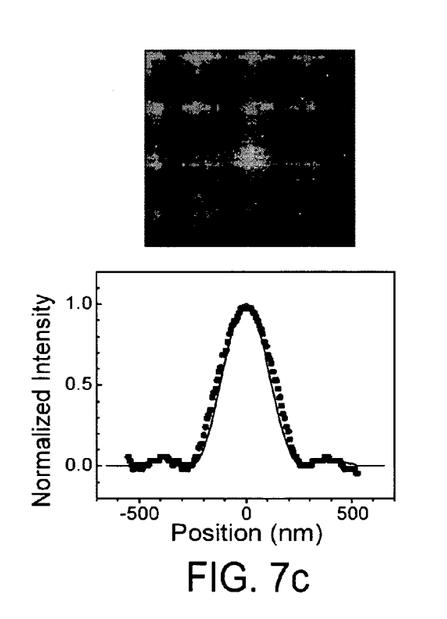
FIG. 7c illustrates image and intensity plots of cardioid condenser with a 50 nm radius opaque disk having an NA=1.1.
Figure 7D:
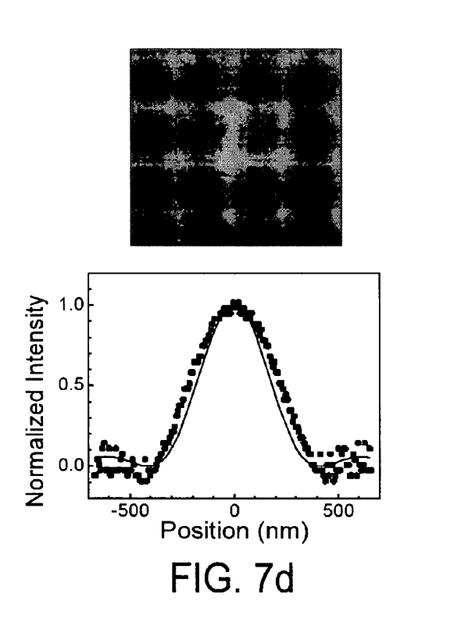
FIG. 7d illustrates image and intensity plots of cardioid condenser with a 50 nm radius opaque disk having an NA=0.7.

FIGS. 7a and 7b include images and intensity plots of 50 nm radius opaque disk where an NA=1.4 is obtained using a cardioid condenser in FIG. 7a, and an Olympus bright-field condenser in FIG. 7b. FIG. 7c illustrates the same for cardioid condenser having an NA=1.1, and FIGS. 7d illustrate the same for a cardioid condenser having an NA=0.7. FIGS. 7a and 7b demonstrate an excellent agreement between the theory and experiment for both C-and-A-condensers. In particular, for A-condenser the theory describes accurately the shape of the central minima as well as the position and height of the first diffraction ring (FIG. 7a). The fitting defines the only unknown parameter in Eq.(5) as m=6.

It is interesting to consider results in FIG. 7a & b from the point of view of famous Rayleigh's criterion that predicts R=0.61($\lambda_0$/N)=238 nm. As known, R is the radius of the first dark ring in the Airy pattern for the isotropically lighting point source and circular entrance aperture. Experimentally, for C-condenser the radius is 260 nm (FIG. 7b), slightly above R=238 nm as expected because of the finite size r=50 nm of imaged disk. Remarkably, for A-condenser the observed radius 165 nm (FIG. 7a) is (238/165)=1.44 times smaller than R. Indeed, this is not a surprise, but is consistent with known narrowing of the central spot in diffraction pattern when the entrance aperture is annular because A-condenser in bright-field regime illuminates only the peripheral ring on the entrance pupil. Similar, but smaller narrowing is observed in dark-field images in FIGS. 7c and 7d, where the measured radii of darkness are 270 nm at N=1.1 (FIG. 7c) and 420 nm at N=0.7 (FIG. 7d), correspondingly 1.1 and 1.15 times less than Rayleigh's criterion values. Again this results from annular-like distribution of scattered light over the entrance pupil. Our mathematical analysis (not shown) for arbitrary amplitude pupil filter defines the upper limit for the PSF narrowing as $x_1/x_0=3.83/2.40=1.6$ times, where $x_0$ and $x_1$ are the first positive roots of Bessel functions $J_0(x)$ and $J_1(x)$.

The practical resolution with annular A-condenser in bright-field is better than $\lambda_0/5$. This surpass 2.2 times Rayleigh's criterion $R=\lambda_0/2.3$ for used numerical aperture N=1.4. The presented theory explains the enhanced image resolution as resulting from two reasons. First, PSF is narrower for annular A-condenser. Second, for A-condenser the diffraction fringes of PSF are strong (FIG. 7a) and subsequently change the phase by $\pi$. Hence, PSF convolution with the object's shape in Eq.(1) smears the image edges less; the effect appears only for coherent illumination.

Now we compare the theory with experiment. In bright-field the calculation does not involve any fitting parameters because all the values in Eq.(2) are known and listed in the text above.

In conclusion, $\lambda_0/5$ or better than 90 nm resolution is demonstrated in imaging with standard research transmission optical microscope modified only by using the homebuilt illumination system with Cardioid annular condenser 20 (FIG. 6). This resolving power is achieved in visual observation or CCD camera recording without any image post-processing. In addition to reported data, a high resolution in real time imaging of live cells is observed. Calculations show that enhanced resolution is in complete accord with the classic diffraction theory of imaging systems and results from high-aperture coherent annular illumination.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen illustration without departing from the spirit and scope of the invention.

We claim:

1. A method of producing mixed illumination in a high resolution system, the method comprising:
   focusing a light source onto an annular entrance slit of a condenser;
   adjusting the system vertically to find a focus spot on the sample, the illumination system including a beam of light, a collimating lens, a mirror and a condenser; and
   opening an iris physically coupled to the objective so as to allow the direct entrance of light into the objective, wherein the illumination system generates diffraction fringes.

2. The method of claim 1, further comprising the step of illuminating a front lens of the objective by an annular light produced by an empty cone of light entering the objective.

3. The method of claim 2, further comprising the step of illuminating the entrance slit of the condenser with an adapter.

4. The method of claim 2, further comprising the step of illuminating the entrance slit of the condenser via an axicon lens.

5. The method of claim 1, further comprising the step of pre-aligning the condenser with an entrance port of the light source and a collimating lens.

6. The method of claim 5, further comprising the step of coupling a light guide between the light source and the collimating lens.

7. The method of claim 6, further comprising the step of providing a flat surface mirror to reflect light from the light source to the entrance slit of the condenser.

8. A method of producing mixed illumination in a high resolution system, the method comprising:
   focusing a light source onto an annular entrance slit of a condenser;
   adjusting the system vertically to find a focus spot on the sample, the illumination system including a beam of light, a collimating lens, a mirror and a condenser; and
   opening an iris physically coupled to the objective so as to allow the direct entrance of light into the objective, wherein the illumination system provides a narrowed point spread function (PSF).

9. The method of claim 8, further comprising the step of illuminating a front lens of the objective by an annular light produced by an empty cone of light entering the objective.

10. The method of claim 9, further comprising the step of illuminating the entrance slit of the condenser with an adapter.

11. The method of claim 9, further comprising the step of illuminating the entrance slit of the condenser via an axicon lens.

12. The method of claim 8, further comprising the step of pre-aligning the condenser with an entrance port of the light source and a collimating lens.

13. The method of claim 12, further comprising the step of coupling a light guide between the light source and the collimating lens.

14. The method of claim 13, further comprising the step of providing a flat surface mirror to reflect light from the light source to the entrance slit of the condenser.

* * * * *